(12) United States Patent
Strasser

(10) Patent No.: US 11,788,601 B2
(45) Date of Patent: Oct. 17, 2023

(54) CENTRIFUGAL PENDULUM DEVICE

(71) Applicant: Schaeffler Technologies AG & Co. KG, Herzogenaurach (DE)

(72) Inventor: Pascal Strasser, Aschbach (FR)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 140 days.

(21) Appl. No.: 17/422,493

(22) PCT Filed: Dec. 19, 2019

(86) PCT No.: PCT/DE2019/101107
§ 371 (c)(1),
(2) Date: Jul. 13, 2021

(87) PCT Pub. No.: WO2020/147883
PCT Pub. Date: Jul. 23, 2020

(65) Prior Publication Data
US 2022/0074465 A1 Mar. 10, 2022

(30) Foreign Application Priority Data
Jan. 16, 2019 (DE) .................. 102019101064.0

(51) Int. Cl.
*F16F 15/14* (2006.01)
(52) U.S. Cl.
CPC ........ *F16F 15/145* (2013.01); *F16F 2222/08* (2013.01); *F16F 2232/02* (2013.01); *F16F 2236/08* (2013.01)
(58) Field of Classification Search
CPC .................................. F16F 2236/08
See application file for complete search history.

(56) References Cited

U.S. PATENT DOCUMENTS

| 10,094,444 B2 * | 10/2018 | Movlazada | F16F 15/145 |
| 2019/0011011 A1 * | 1/2019 | Higuchi | F16F 15/31 |

FOREIGN PATENT DOCUMENTS

| CN | 103975177 | 8/2014 |
| CN | 105452713 | 3/2016 |
| CN | 106337898 | 1/2017 |
| CN | 106471277 | 3/2017 |
| CN | 105822722 | 4/2018 |
| CN | 108691951 | 10/2018 |
| DE | 102017113054 | 12/2018 |
| EP | 2833018 | 2/2015 |

* cited by examiner

*Primary Examiner* — Vicky A Johnson
(74) *Attorney, Agent, or Firm* — Volpe Koenig

(57) ABSTRACT

A centrifugal pendulum device having at least one flange and at least one centrifugal weight disposed displaceably on the flange. The centrifugal weight is guided displaceably on the flange by roller elements; the flange has openings with guide tracks situated radially outwardly, and the centrifugal weight has two side elements with a guide rail arranged therebetween and has guide tracks; the guide rail is inserted into an opening in the flange; the weight guide tracks are arranged radially inside the flange guide track such that they oppose each other in the radial direction at the same axial height, and roller elements are arranged radially therebetween; the flange having first and second openings with respective first and second guide tracks; the at least one centrifugal weight being inserted into one of the first or second openings depending on the choice of rotary vibration to be damped.

16 Claims, 4 Drawing Sheets

CENTRIFUGAL PENDULUM DEVICE

CROSS-REFERENCE TO RELATED APPLICATIONS

This application is the U.S. National Phase of PCT Appln. No. PCT/DE2019/101107, filed Dec. 19, 2019, which claims priority to DE 102019101064.0, filed Jan. 16, 2019, the entire disclosures of which are incorporated by reference herein.

TECHNICAL FIELD

The disclosure relates to a centrifugal pendulum device, in particular for the drive train of a motor vehicle.

BACKGROUND

Centrifugal pendulum devices are known in the prior art. Centrifugal pendulum devices are known in which centrifugal weights are arranged displaceably on a flange, which centrifugal weights have side elements on both sides of the flange and which are connected to one another with spacer bolts, wherein the spacer bolts extend through openings in the flange which are dimensioned so that the centrifugal weight corresponds to a pendulum mass that the intended damping can displace. Thereby roller elements are provided which extend axially through the flange and into the side elements of the centrifugal weight and, there, are in contact with guide tracks in the flange and in the side elements of the centrifugal weight and roll thereover so that the displacement of the centrifugal weight relative to the flange is guided in a defined path of movement.

Centrifugal pendulum devices are also known in which the flange has a radially outer guide track and the centrifugal weight has a radially inner guide track which oppose each other at the same axial height so that the roller elements provided radially between the guide track of the flange and the guide track of the centrifugal weight at the same axial height lead to the displacement of the centrifugal weight relative to the flange. The centrifugal weights have two spaced-apart side elements which are connected to one another via a guide rail arranged radially on the inside, wherein the guide rail forms the guide tracks of the centrifugal weight. The centrifugal weight has an approximately U-shaped contour in a radial section, which is why this type of centrifugal pendulum device is also referred to as a U-shaped centrifugal pendulum device.

In centrifugal pendulum devices, the effective torsional vibration damping is dependent on the particular intended torsional vibration order to be damped so that the contour of the guide tracks on the flange and/or on the centrifugal weight is adapted to the vibration order to be damped. If, for example, the intention is that the same centrifugal pendulum device is to be used on different internal combustion engines or in drive trains with different internal combustion engines, it can be that the centrifugal pendulum device, which is optimally designed for one internal combustion engine, does not favorably dampen rotary vibrations in another internal combustion engine because the coordination to the individual vibration orders of this internal combustion engine is absent. Therefore, in the prior art, the flange and often also the centrifugal weights are exchanged for a basically very similar flange or very similar centrifugal weights, in which only the contour of the guide track or guide tracks is adapted to the desired vibration order to be damped. However, this leads to an increased number of parts because the various components must be kept ready for the assembly of the centrifugal pendulum devices.

SUMMARY

It is the object of the present disclosure to create a centrifugal pendulum device which can be produced simply and inexpensively and which can also be used in various applications. It is also the object to create a related family of centrifugal pendulum devices.

The object of the centrifugal pendulum device is achieved with one or more of the features disclosed herein.

One exemplary embodiment relates to a centrifugal pendulum device having at least one flange and having at least one centrifugal weight arranged displaceably on the at least one flange, wherein the at least one centrifugal weight is guided displaceably by roller elements on the at least one flange, wherein the flange has openings with guide tracks arranged radially on the outside and the at least one centrifugal weight has two side elements, having a guide rail with guide tracks arranged therebetween, wherein the guide rail of a centrifugal weight is inserted into an opening of the flange, wherein the guide tracks of the one centrifugal weight are arranged radially inside the guide track of the flange so that the guide tracks of the flange and the guide tracks of the one centrifugal weight oppose each other at the same axial height in the radial direction and roller elements are arranged therebetween in the radial direction, wherein the flange has at least one first opening with first guide tracks and at least one second opening with second guide tracks, depending on the choice of the rotary vibration to be damped, wherein the at least one centrifugal weight is inserted into a first or second opening assigned to the rotary vibration to be damped. Thus, depending on the intended use of the centrifugal pendulum device, i.e., depending on the internal combustion engine or depending on the source of the rotational irregularities to be damped, the same flange with centrifugal weights can be used in the respectively assigned openings. This reduces the number of parts because the flange can also be used for different applications.

It is also advantageous if the flange has two first openings with first guide tracks and two second openings with second guide tracks, wherein two centrifugal weights are provided which are each inserted into the two first openings or into the two second openings. As a result, two centrifugal weights can be inserted into the flange so that two centrifugal weights are used in each case so that the centrifugal pendulum device is also advantageous with regard to avoiding an imbalance in the respective application thereof. In this case, a respective centrifugal weight can be inserted into a respective first or second opening so that, for example, a respective centrifugal weight is inserted into the two first openings or that a respective centrifugal weight is inserted into the two second openings.

It is also expedient if a first centrifugal weight is inserted into a first opening having the first guide tracks or that a second centrifugal weight is inserted into a second opening having the second guide tracks. Correspondingly, a first centrifugal weight can also be inserted into each first opening and, alternatively, a second centrifugal weight can be inserted into each second opening.

It is also advantageous if a first centrifugal weight is inserted into each first opening having the first guide tracks or that a second centrifugal weight is inserted into every second opening having the second guide tracks. This improves the effectiveness of the torsional vibration damping for the respective application.

It is particularly advantageous if a first centrifugal weight is not equal to a second centrifugal weight. This means that the first centrifugal weight is adapted to the rotary vibration of the first application to be damped and that the second centrifugal weight is adapted to the rotary vibration of the second application to be damped. The masses of the centrifugal weights can be different and/or the guide tracks of the respective centrifugal weights can differ.

It is also particularly advantageous if a first centrifugal weight is designed to be equal to a second centrifugal weight. This means that the first centrifugal weight corresponds to a second centrifugal weight so that the masses and the guide tracks are the same. This allows the number of parts to be reduced during assembly, which is advantageous.

It is particularly advantageous if the two first openings are arranged to oppose each other and the two second openings are arranged to oppose each other, wherein the first openings and the second openings alternate in the circumferential direction. It is thereby achieved that, in both applications, when using the first or the second openings, favorable balance ratios are present in each case.

The object relating to the family of centrifugal pendulum devices is also achieved with one or more of the features disclosed herein.

One exemplary embodiment relates to a family of centrifugal pendulum devices with a first centrifugal pendulum device in which at least one centrifugal weight is inserted into a first opening and with a second centrifugal pendulum device in which at least one centrifugal weight is inserted into a second opening.

An alternative exemplary embodiment of the invention relates to a family of centrifugal pendulum devices with a first centrifugal pendulum device, in which two centrifugal weights are provided, each inserted into a first opening, and with a second centrifugal pendulum device, in which two centrifugal weights are provided, each of which is inserted into a second opening.

BRIEF DESCRIPTION OF THE DRAWINGS

The present disclosure is explained in more detail below using preferred exemplary embodiments in conjunction with the associated figures.

In the figures.

DETAILED DESCRIPTION

Figure 1:
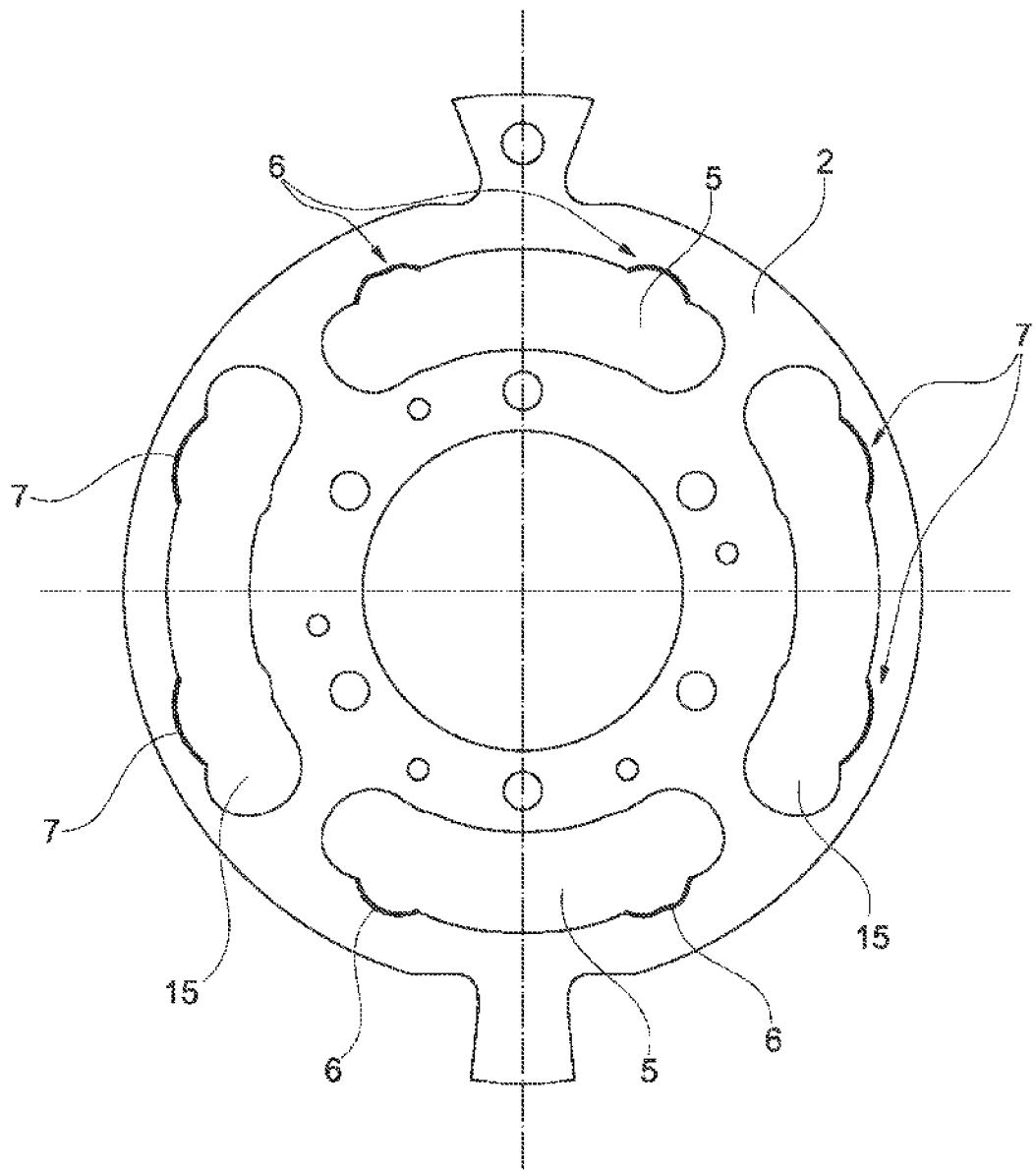
FIG. 1 shows a side view of a flange of a centrifugal pendulum device according to the disclosure.

FIG. 1 shows a flange 2 of a centrifugal pendulum device 1. A detail from such a centrifugal pendulum device 1 is shown in FIG. 6.

The centrifugal pendulum device 1 has at least one flange 2, wherein at least one centrifugal weight 3 is provided which is arranged displaceably on the at least one flange 2. The at least one centrifugal weight 3 is guided displaceably by roller elements 4 on the at least one flange 2.

For this purpose, the flange 2 has openings 5 with guide tracks 6, 7 arranged radially on the outside thereof. The at least one centrifugal weight 3 is designed with two side elements 8 and with a guide rail 9 with guide tracks 10 arranged therebetween. The guide rail 9 of a centrifugal weight 3 is inserted into an opening 5 of the flange 2 so that the guide tracks 10 of the one centrifugal weight 3 are arranged radially inside the guide tracks 6, 7 of the flange 2. The guide tracks 6, 7, and 10 are essentially opposite one another. The opening 5 is designed in such a way that the respective centrifugal weight 3 can move with the guide rail 9 thereof within the opening 5. For this purpose, the opening 5 is formed in an elongated and arched manner so that the guide rail can move along an essentially arched path with certain pivoting in the opening 5.

Figure 6:
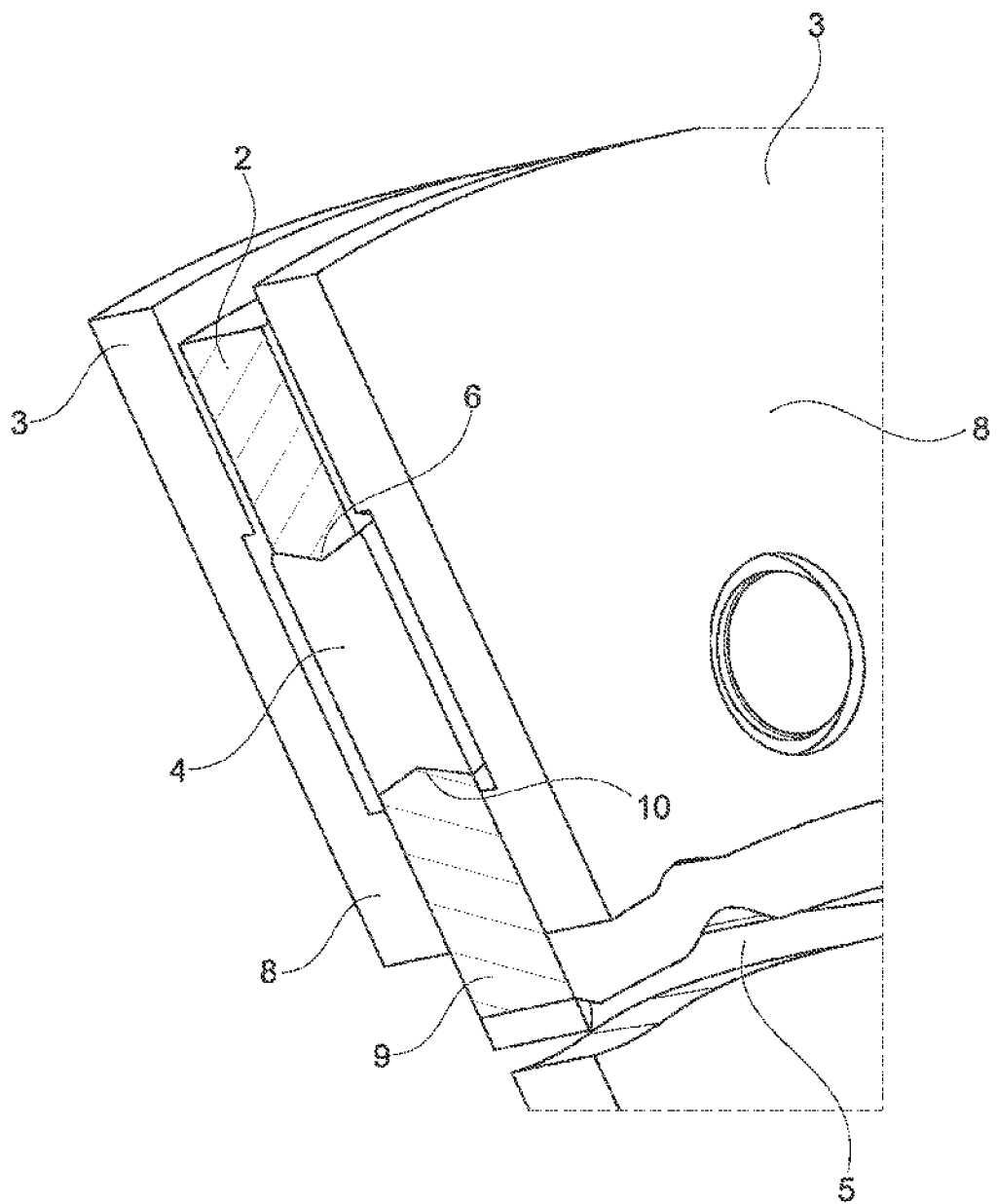
FIG. 6 shows a sectional illustration of a flange with centrifugal weights of a centrifugal pendulum device according to the disclosure.

In FIG. 6 it can also be seen that the guide tracks 6 of the flange 2 and the guide tracks 10 of the one centrifugal weight 3 are arranged to oppose each other in the radial direction at the same axial height.

The respective roller elements 4 are arranged in the radial direction between a guide track 6, 7 of the flange 2 and a guide track 10 of the centrifugal weight 3. This construction allows a relatively slim design to be achieved and the centrifugal weights do not have any openings through which roller elements extend in the axial direction, which increases the mass of the centrifugal weight.

As can be seen in FIG. 1, the flange 2 has at least one first opening 5, preferably two first openings 5, with first guide tracks 6 and at least one second opening 15, preferably two second openings 15, with second guide tracks 7. The guide tracks 6, 7 differ and are adapted to the rotary vibrations or the damping thereof in various applications.

Depending on the application, i.e., depending on the choice of the rotary vibration to be damped, the at least one centrifugal weight 3 is inserted into one of the first or second openings 5, 15 assigned to the rotary vibration to be damped.

Figure 3:
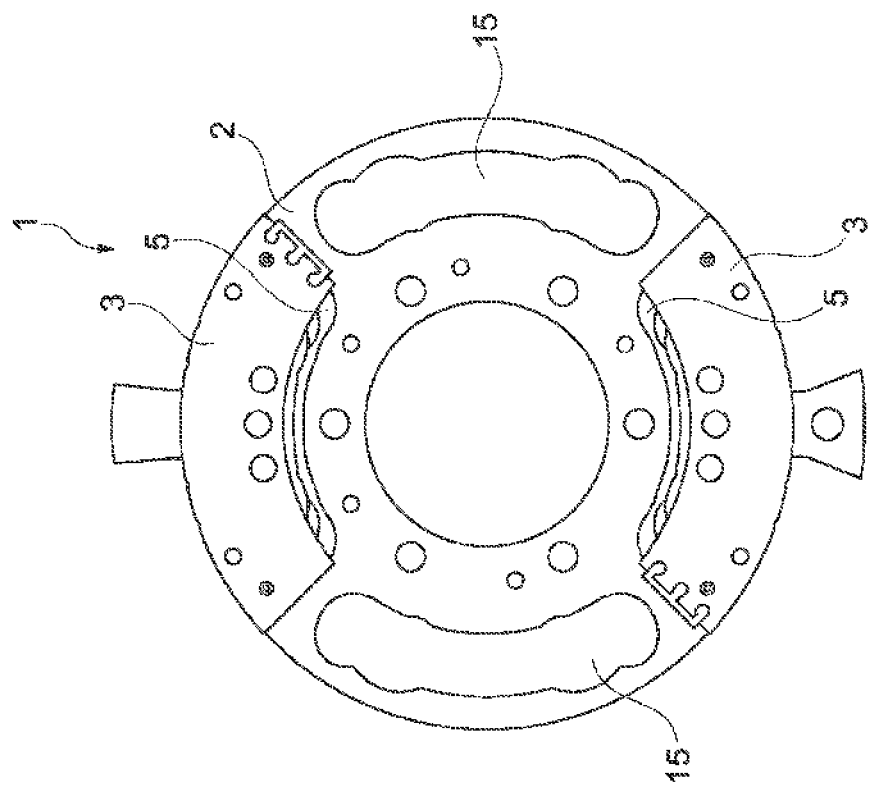
FIG. 3 shows a perspective view of a flange according to FIG. 1 with two centrifugal weights which are inserted into first openings.
Figure 2:
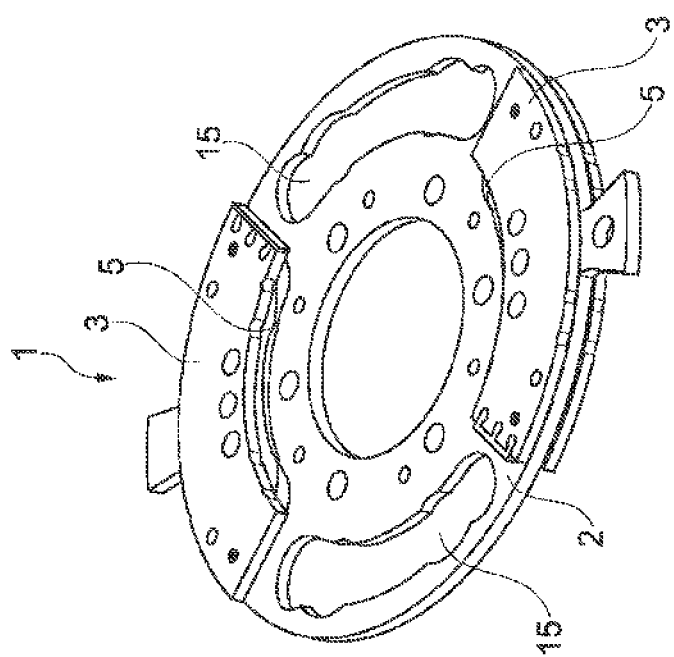
FIG. 2 shows a side view of a flange according to FIG. 1 with two centrifugal weights which are inserted into first openings.
Figure 5:
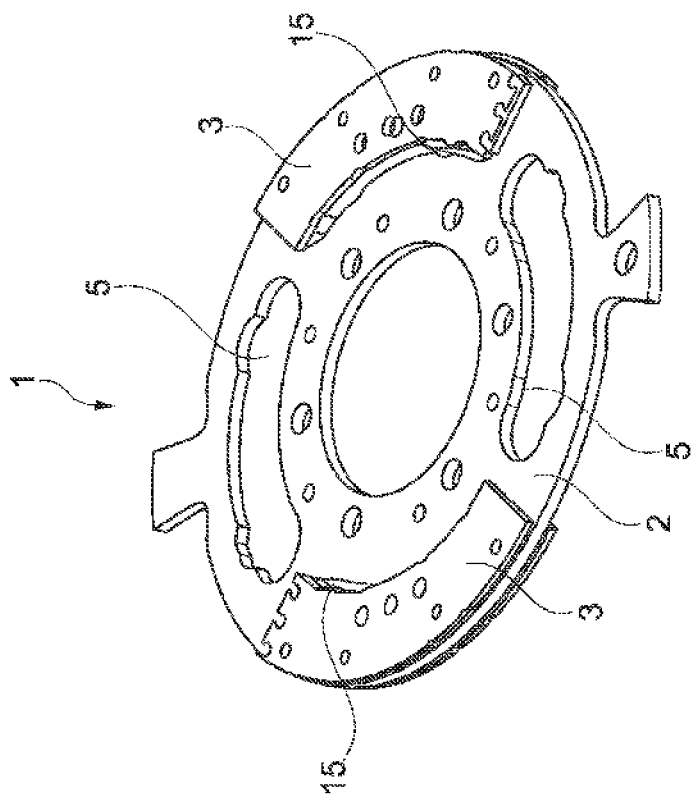
FIG. 5 shows a perspective view of a flange according to FIG. 1 with two centrifugal weights which are inserted into second openings.
Figure 4:
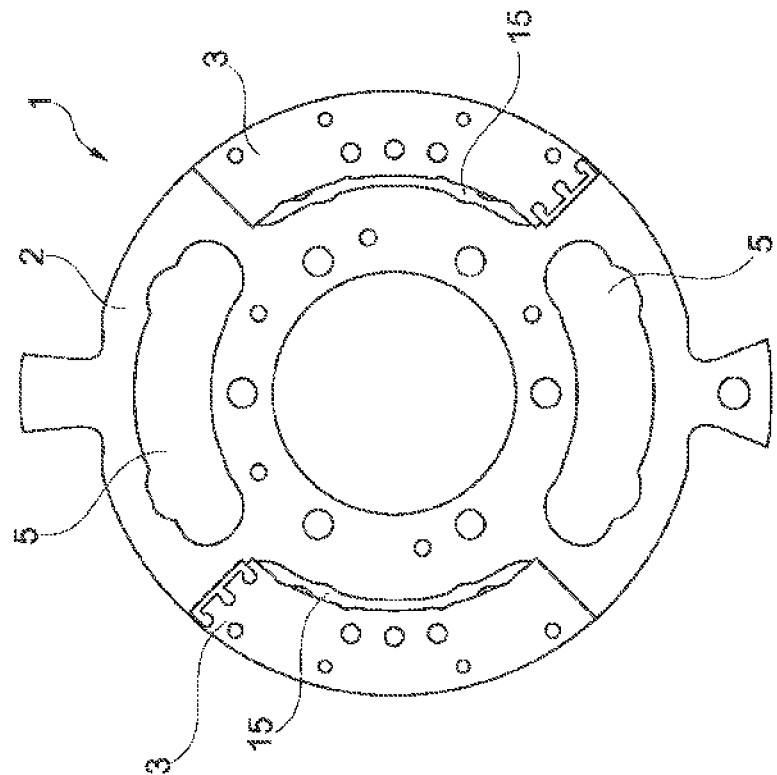
FIG. 4 shows a side view of a flange according to FIG. 1 with two centrifugal weights which are inserted into second openings.

FIGS. 2 and 3 show the centrifugal pendulum device 1 in which the centrifugal weights 3 are inserted into the openings 5 and FIGS. 4 and 5 show the centrifugal pendulum device 1 in which the centrifugal weights 3 are inserted into the openings 15.

This creates a family of two centrifugal pendulum devices 1 in which only one flange 2 with two different types of openings 5, 15 having different guide tracks 6, 7 is provided. In the case of one family member of the family of centrifugal pendulum devices 1, the centrifugal weights 3 are inserted into the openings 5 and, in the case of another family member, the centrifugal weights are inserted into the other openings 15. This results in different centrifugal pendulum devices 1 which have different damping properties.

Thus, in one exemplary embodiment, the flange 2 advantageously has two first openings 5 with first guide tracks 6 and it has two second openings 15 with second guide tracks 7, wherein two centrifugal weights 3 are provided, each of which is inserted into the two first openings 5 or in the two second openings 15. The same centrifugal weights 3 can advantageously be used for both family members and inserted into the respective opening 5, 15.

In an alternative exemplary embodiment, the flange 2 has first and second openings 5, 15, wherein one family member has a first centrifugal weight 3 inserted into a first opening 5 having the first guide tracks 6 or another family member has a second centrifugal weight 3 inserted into a second opening 15 having the second guide tracks 10. The first and the second centrifugal weight are different, that is, they are not structurally identical or unequal. Alternatively, they can also be formed to be structurally identical.

According to a further exemplary embodiment, a first centrifugal weight 3 is inserted into each first opening 5 having the first guide tracks 6 for one family member or a second centrifugal weight 3 is inserted into each second opening 15 having the second guide tracks 7 for another family member. The first and second centrifugal weights 3 are different, that is, they are not structurally identical or unequal. Alternatively, they can also be formed to be structurally identical.

FIGS. 1 to 5 show that the two first openings 5 are arranged to oppose each other and the two second openings 15 are arranged to oppose each other, wherein the first openings 5 and the second openings 15 alternate in the circumferential direction of the flange.

LIST OF REFERENCE SYMBOLS

1 Centrifugal-force pendulum device
2 Flange
3 Centrifugal weight
4 Roller element
5 First opening
6 First guide track
7 Second guide track
8 Side element
9 Guide rail
10 Second guide track
15 Second opening

The invention claimed is:

1. A centrifugal pendulum device, comprising:
   at least one flange;
   at least one centrifugal weight disposed displaceably on the at least one flange, the at least one centrifugal weight being guided displaceably on the at least one flange by roller elements;
   the flange having openings with guide tracks arranged radially on a radially outer side thereof;
   the at least one centrifugal weight having two side elements with guide rails arranged therebetween with weight guide tracks, the guide rail of one said centrifugal weight being inserted into one of the openings of the flange, the weight guide tracks being arranged radially inside the guide tracks of the flange so that the guide tracks of the flange and the weight guide tracks are arranged to oppose each other at a same axial height in a radial direction and the roller elements are arranged therebetween in the radial direction;
   the openings in the flange include at least one first opening configured for damping a first rotary vibration order and having first ones of the guide tracks, and at least one second opening configured for damping a second rotary vibration order and having second ones of the guide tracks; and
   the guide rail of the at least one centrifugal weight is inserted into one of the first or the second opening that is assigned to a selected one of the first or second rotary vibration orders to be damped.

2. The centrifugal pendulum device according to claim 1, wherein the flange has two of the first openings having the first guide tracks and two of the second openings having the second guide tracks, two of the centrifugal weights are provided which are inserted respectively into the two first openings or into the two second openings.

3. The centrifugal pendulum device according to claim 2, wherein the two first openings are arranged to oppose each other and the two second openings are arranged to oppose each other, with the first openings and the second openings alternating.

4. The centrifugal pendulum device according to claim 1, wherein a first one of the centrifugal weights is inserted into the first opening having the first guide tracks or a second one of the centrifugal weights is inserted into the second opening having the second guide tracks.

5. The centrifugal pendulum device according to claim 4, wherein the first centrifugal weight is not equal to the second centrifugal weight.

6. The centrifugal pendulum device according to claim 4, wherein the first centrifugal weight is equal to the second centrifugal weight.

7. The centrifugal pendulum device according to claim 1, wherein the at least one first opening comprises two of the first openings and respective a first ones of the centrifugal weights are inserted into each of the first openings having the first guide tracks or the at least one second opening comprises two of the second openings and respective second ones of the centrifugal weights are inserted into each of the second openings having the second guide tracks.

8. The centrifugal pendulum device according to claim 7, wherein the first centrifugal weight is not equal to the second centrifugal weight.

9. The centrifugal pendulum device according to claim 7, wherein the first centrifugal weight is equal to the second centrifugal weight.

10. A family of centrifugal pendulum devices having first and second ones of the centrifugal pendulum devices according to claim 1 in the first centrifugal pendulum device the at least one centrifugal weight is inserted into the at least one first opening and in the second centrifugal pendulum device the at least one centrifugal weight is inserted into the at least one second opening.

11. The family of centrifugal pendulum devices according to claim 10, wherein the at least one first opening in the first centrifugal pendulum device comprises two of the first openings, the at least one centrifugal weight of the first centrifugal pendulum device comprises two first centrifugal weights, each of which is inserted into one of the first openings and wherein the at least second opening in the second centrifugal pendulum device comprises two of the second openings, the at least one centrifugal weight of the second centrifugal pendulum device comprises two second centrifugal weights, each of which is inserted into one of the second openings.

12. A centrifugal pendulum device, comprising:
   a flange;
   a centrifugal weight disposed displaceably on the flange, the centrifugal weight being guided displaceably;
   the flange having openings with guide tracks arranged radially on a radially outer side thereof;
   the centrifugal weight having two side elements with guide rails arranged therebetween with weight guide tracks, the guide rail of the centrifugal weight being inserted into one of the openings of the flange, the weight guide tracks being arranged radially inside the guide tracks of the flange so that the guide tracks of the flange and the weight guide tracks are arranged to oppose each other at a same axial height in a radial direction;

the openings in the flange include two first openings configured for damping a first rotary vibration order and having first ones of the guide tracks, and two second opening configured for damping a second rotary vibration order and having second ones of the guide tracks; and wherein there are two of the centrifugal weights, the guide rail of each being inserted into one of the first openings or the guide rail of each being inserted into one of the second openings that is assigned to a selected one of the first or second rotary vibration orders to be damped.

13. The centrifugal pendulum device according to claim 12, further comprising roller elements arranged between the weight guide tracks and the guide tracks of the flange in the radial direction.

14. The centrifugal pendulum device according to claim 12, wherein a weight of one of the centrifugal weights is not equal to a weight of the other centrifugal weight.

15. The centrifugal pendulum device according to claim 12, wherein a weight of one of the centrifugal weights is equal to a weight of the other centrifugal weight.

16. The centrifugal pendulum device according to claim 12, wherein the two first openings are arranged to oppose each other and the two second openings are arranged to oppose each other, with the first openings and the second openings alternating.

* * * * *